(12) United States Patent
Herderich et al.

(10) Patent No.: US 9,310,229 B2
(45) Date of Patent: Apr. 12, 2016

(54) SENSOR SYSTEM AND METHOD FOR MANUFACTURING A SENSOR SYSTEM

(71) Applicants: Hans-Juergen Herderich, Kernen (DE); Hans-Martin Irslinger, Kusterdingen (DE); Juergen Kurle, Reutlingen (DE); Florian Guffarth, Reutlingen (DE)

(72) Inventors: Hans-Juergen Herderich, Kernen (DE); Hans-Martin Irslinger, Kusterdingen (DE); Juergen Kurle, Reutlingen (DE); Florian Guffarth, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 369 days.

(21) Appl. No.: 13/757,300

(22) Filed: Feb. 1, 2013

(65) Prior Publication Data

US 2013/0192361 A1    Aug. 1, 2013

(30) Foreign Application Priority Data

Feb. 1, 2012    (DE) .......................... 10 2012 201 416

(51) Int. Cl.
| | |
|---|---|
| *G01L 19/14* | (2006.01) |
| *G01D 11/24* | (2006.01) |
| *G01D 11/30* | (2006.01) |
| *G01L 19/00* | (2006.01) |

(52) U.S. Cl.
CPC .............. *G01D 11/245* (2013.01); *G01D 11/30* (2013.01); *G01L 19/0084* (2013.01); *Y10T 29/49004* (2015.01)

(58) Field of Classification Search
USPC .......................... 73/756, 431, 753, 866.5, 715
See application file for complete search history.

(56) References Cited

U.S. PATENT DOCUMENTS

| | | | |
|---|---|---|---|
| 6,742,395 B1* | 6/2004 | Borgers et al. ................... | 73/717 |
| 6,745,633 B2* | 6/2004 | Sasaki et al. .................... | 73/727 |
| 7,950,287 B2 | 5/2011 | Hauer et al. | |
| 2006/0230815 A1* | 10/2006 | Borzabadi et al. ................ | 73/40 |
| 2009/0282926 A1* | 11/2009 | Hauer et al. .................... | 73/756 |

FOREIGN PATENT DOCUMENTS

DE    10 2008 001 509    11/2009

* cited by examiner

*Primary Examiner* — Peter Macchiarolo
*Assistant Examiner* — Anthony W Megna Fuentes
(74) *Attorney, Agent, or Firm* — Kenyon & Kenyon LLP

(57) ABSTRACT

A sensor system having a sensor element, a housing in which sensor element is situated and which seals the sensor element from the outside world, at least one first electrical contact element which is electrically coupled with the sensor element; a plug connector, which has at least one second electrical contact element, and at least one spring element which is coupled between the at least one second electrical contact element and the at least one first electrical contact element for electrical contacting, so that the sensor element is electrically connected to the second electrical contact element of the plug connector.

10 Claims, 5 Drawing Sheets

SENSOR SYSTEM AND METHOD FOR MANUFACTURING A SENSOR SYSTEM

CROSS REFERENCE

The present application claims the benefit under 35 U.S.C. §119 of German Patent Application No. DE 102012201416.0 filed on Feb. 1, 2012, which is expressly incorporated herein by reference in its entirety.

FIELD

The present invention relates to a sensor system and a method for manufacturing a sensor system, in particular a peripheral sensor for pressure measurement.

BACKGROUND INFORMATION

Peripheral sensors, i.e., sensors not installed in direct physical proximity to corresponding control and analysis devices, usually include microelectromechanical sensor elements which are situated in sensor cell housings. The sensor element may be mounted on the housing bottom, for example, the housing being hermetically sealed from the outside world and connecting pins are guided out of the housing for electrical contacting. In addition, an opening for feeding the medium to be measured into the housing may be provided for pressure sensor elements. Such pressure sensor cells may be used for detecting the pressure in liquid and gaseous media.

The installed sensor elements must be tested and balanced for their functionality; ideally this should take place very early during the production process to minimize process costs and to allow the required test steps to be carried out easily and rapidly.

German Patent Application No. DE 10 2008 001 509 A1 describes a pressure sensor configuration having a sensor element and a hermetically sealed housing, which has a pressure feed and connecting pins leading out of the housing for electrical contacting.

There is a demand for uniform and robust sensor cells, which may be combined in an inexpensive, flexible and variable manner with different connector systems and/or media interfaces.

SUMMARY

According to one aspect, the present invention provides a sensor system having a sensor element, a housing in which the sensor element is situated and which seals the sensor element from the outside world, at least one first electrical contact element which is electrically coupled to the sensor element, a plug connector having at least one second electrical contact element and at least one spring element which is coupled for electrical contacting between the at least one second electrical contact element and the at least one first electrical contact element, so that the sensor element is electrically connected to the second electrical contact element of the plug connector.

According to another aspect, the present invention provides a method for manufacturing a sensor system, in particular a sensor system according to the present invention, having the steps of situating a sensor element in a housing sealing it off from the outside world, electrically contacting at least one first electrical contact element to the sensor element, testing the functionality of the sensor element in the housing and, after the testing step, connecting a plug connector having at least one second electrical contact element via at least one spring element, which is coupled to the housing between the at least one second electrical contact element and the at least one first electrical contact element, so that the sensor housing is electrically connected to the second electrical contact element of the plug connector.

In accordance with an example embodiment of the present invention, a standardized sensor cell with respect to the design having a sensor element in a housing is provided, which, at the same time, is robust with respect to adverse external conditions and has a compact design. The sensor cell here may have already been tested for its functionality and balanced before the electrical contacting with a plug connector or before being connected to a pressure connection. The sensor system offers a modular design which permits variable interfaces to a medium and/or for electrical connections. This is accomplished via spring contacts to a plug connector, which may be reliably and flexibly attached to the sensor element. Contacting via spring elements is possible without any additional connecting steps such as welding, soldering, gluing or bonding; furthermore, a particularly good mechanical stress decoupling between the sensor cell and the plug connector is possible through this type of coupling.

The low demands on plug connectors and/or pressure connections, which are coupled to the sensor cell, are particularly advantageous since the full functionality of the sensor system is already implemented in the robust sensor cell.

According to one specific embodiment, the spring element may include a spiral spring and the first electrical contact element may include a connecting pin, the spiral spring being attached to the connecting pin. This permits variable electrical contacting between the plug connector and the sensor element, which provides a mechanical stress decoupling at the same time.

According to one preferred specific embodiment, the spiral spring may have a first section having a first spiral diameter and a second section, which is adjacent to the first section and has a second spiral diameter, which is smaller than the first spiral diameter. Alternatively, the connecting pin may have a first section having a first pin diameter and a second section, which is adjacent to the first section and has a second pin diameter, which is smaller than the first pin diameter. In both cases, it is advantageously possible to establish a mechanical stop between the electrical feedthrough and the electrical contact surface, so that reliable electrical contacting with the sensor element in the housing is made possible.

According to another specific embodiment, the spring element may have a flexible, electrically conductive clip, which is attached to the first electrical contact element. Here again, a stress-decoupled electrical contacting between the sensor element and the plug connector is possible in a simple and robust manner.

According to another specific embodiment, the spring element may include a spiral spring having a tapering shape and the first electrical contact element may have a connecting pin, the spiral spring being attached to the second electrical contact element and sitting on the connecting pin at the tapered end.

According to another specific embodiment, the electrical contact element may be passed through a first housing opening in the housing. Therefore, a hermetic seal of the housing may be ensured without the electrical contacting of the sensor element being impaired from the outside.

According to another specific embodiment, the sensor element may include a first seal, which is situated between the plug connector and the housing. This has the advantage that the electrical contacts may be shielded completely from the outside world, for example, from the harmful effects of aggressive chemical substances which would damage the functionality of the sensor system.

According to another specific embodiment, the sensor element may include a pressure sensor element and the housing may have a second housing opening via which the sensor element is connected to the outside world. This type of sensor system is very advantageous in particular for pressure sensors which are often used in liquid media such as oil or other liquids which are potentially detrimental to the functionality of an electrical contacting.

According to another specific embodiment, the sensor system may have a pressure connection having a recess in which the housing is accommodated so that it is flush and has a pressure channel coupled to the second housing opening, so that a medium is conductible through the pressure channel to the sensor element. Flexible and application-specific contacting of the sensor system to various pressure connections may be enabled due to the modular design of the sensor system.

According to another specific embodiment, the sensor system may therefore have a second seal situated between the pressure connection on the housing. This has the advantage of permitting a hermetically sealed connection between the housing and the pressure connection.

Additional features and advantages of specific embodiments of the present invention are explained in the description below with reference to the figures.

BRIEF DESCRIPTION OF THE DRAWINGS

The example embodiments and refinements described herein may be combined with one another in any way, if meaningful. Other possible embodiments, refinements and implementations of the present invention also include combinations of features of the present invention described above or below with respect to the exemplary embodiments, even if they are not mentioned explicitly.

The figures are intended to give a further understanding of specific example embodiments of the present invention. They illustrate specific example embodiments and explain principles of the present invention in conjunction with the description.

Other specific embodiments and many of the advantages mentioned are derived with respect to the figures. The elements of the figures are not necessarily shown true to scale.

Figure 1:
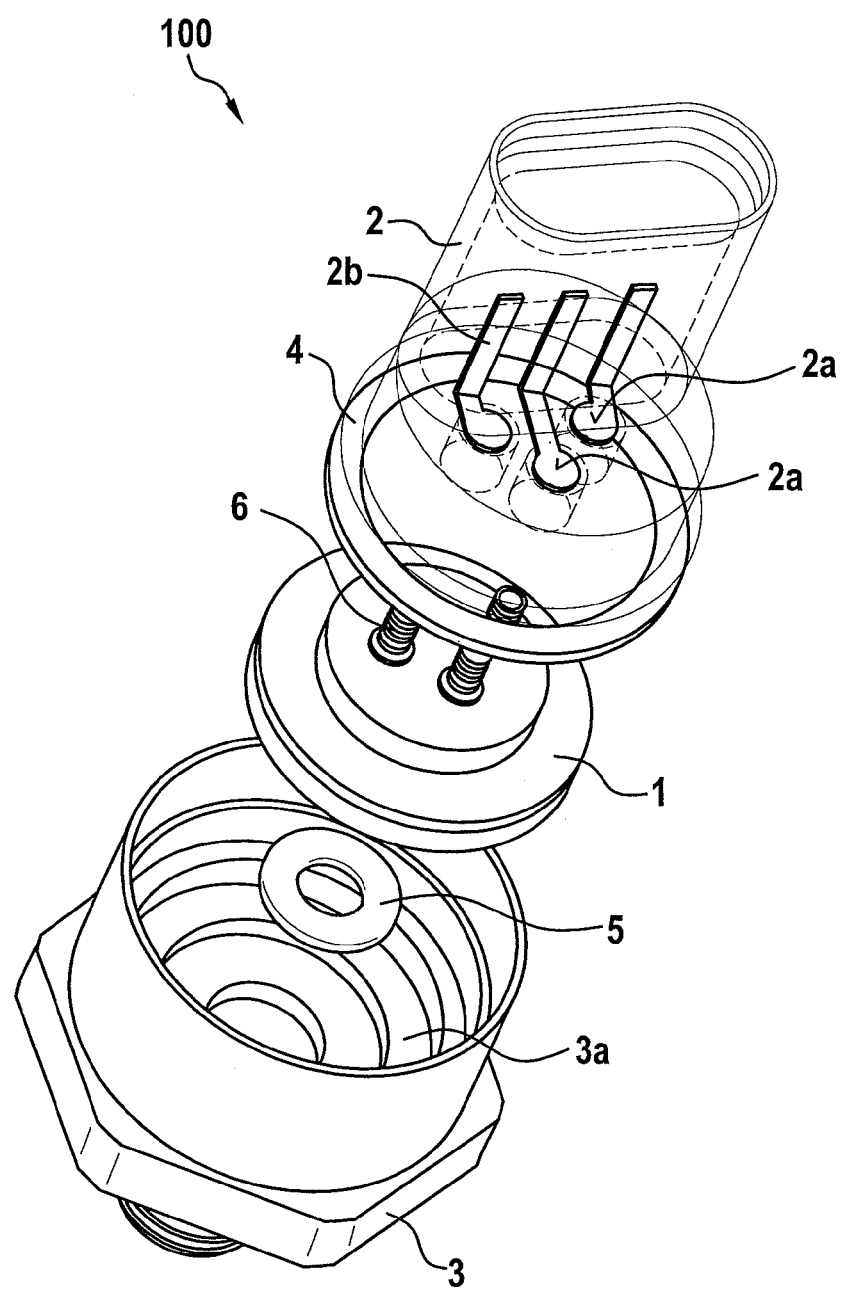

FIG. 1 shows a schematic depiction of a sensor system according to one specific example embodiment of the present invention.

Figure 2:
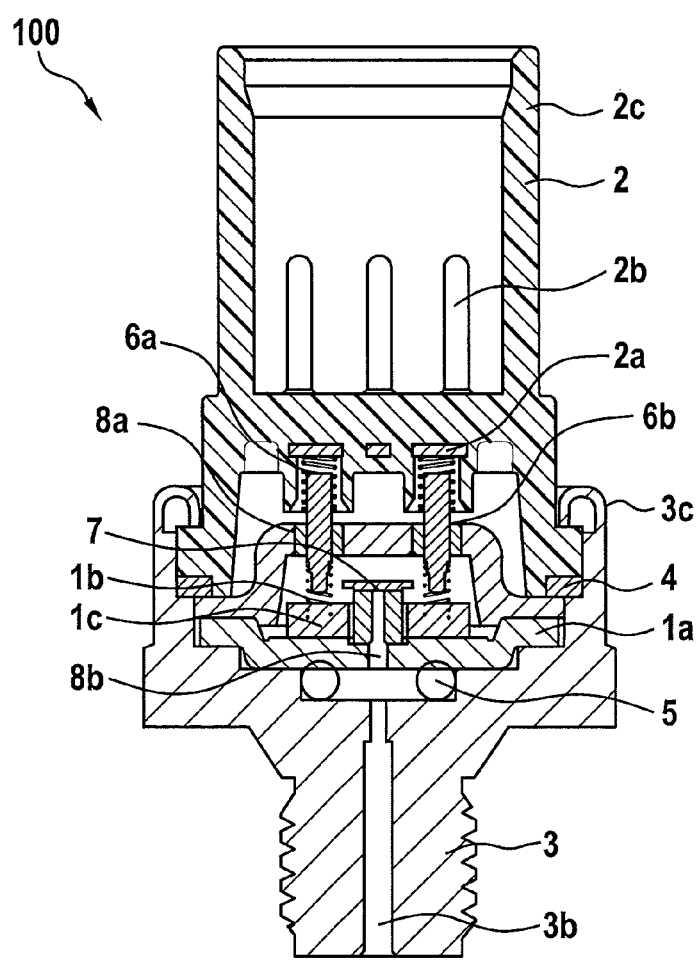

FIG. 2 shows a schematic depiction of a sectional view through a sensor system according to another specific example embodiment.

Figure 3:
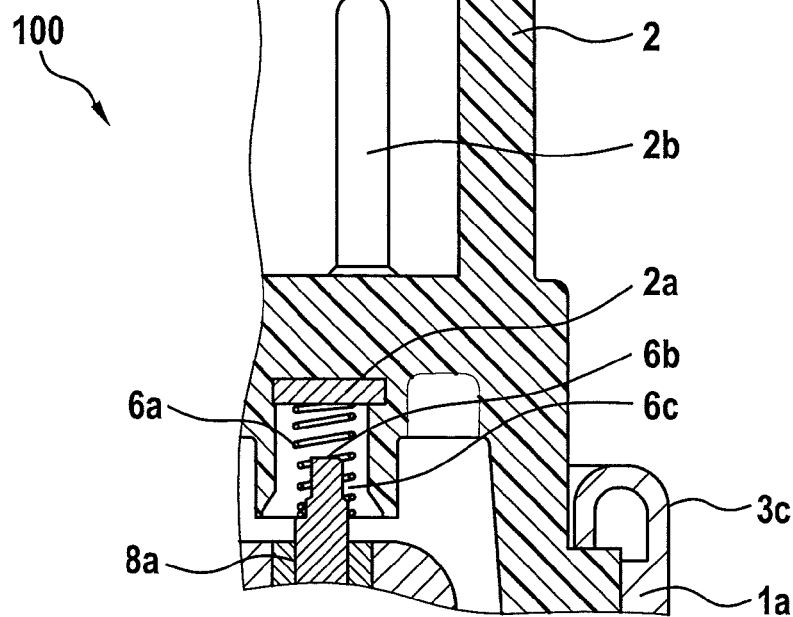

FIG. 3 shows a schematic depiction of a detail of a sensor system according to another specific example embodiment.

Figure 4:
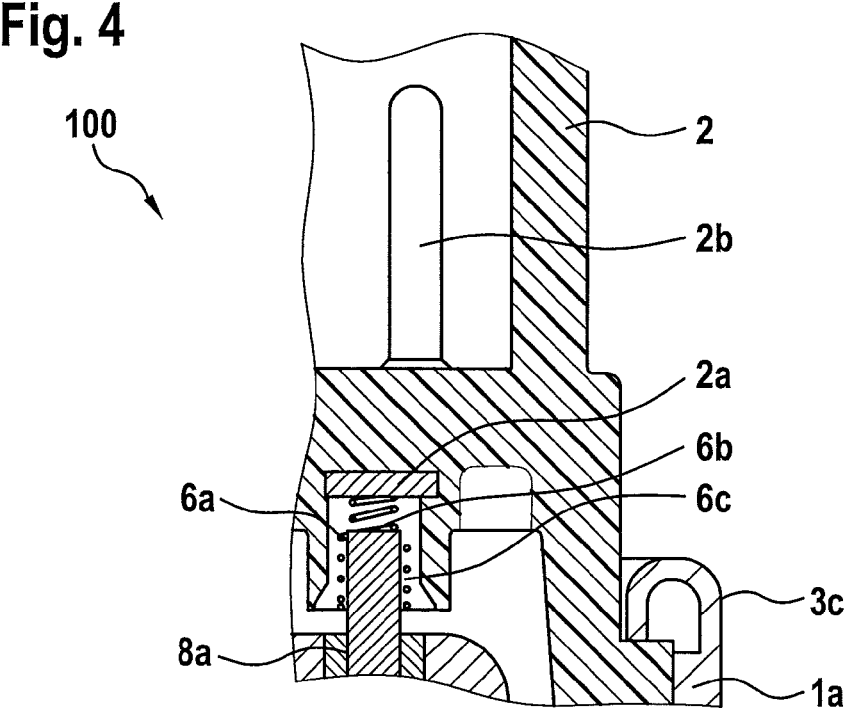

FIG. 4 shows a schematic depiction of a detail of a sensor system according to another specific example embodiment.

Figure 5:
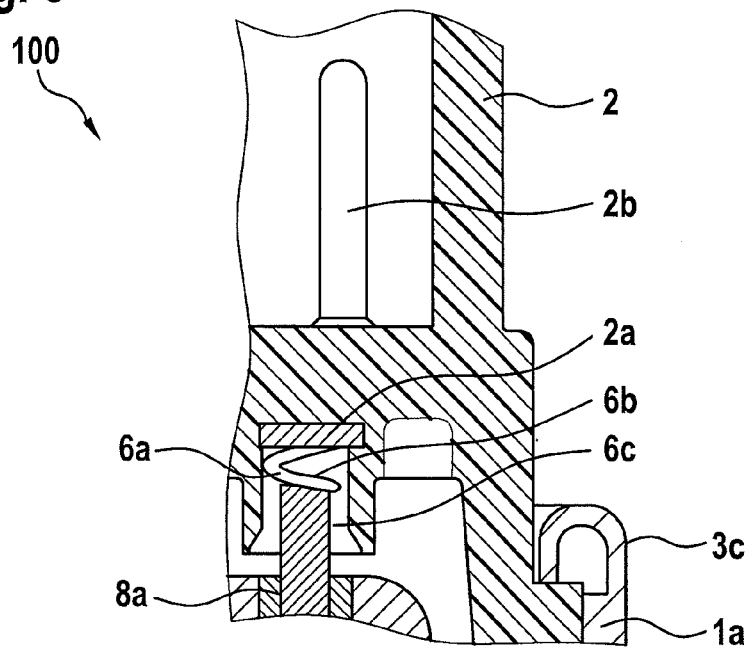

FIG. 5 shows a schematic depiction of a detail of a sensor system according to another specific example embodiment.

Figure 6:
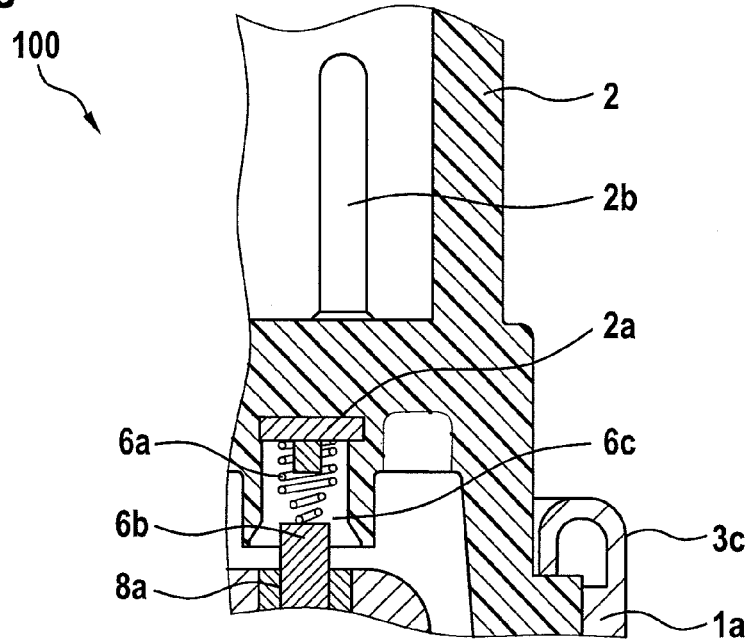

FIG. 6 shows a schematic depiction of a detail of a sensor system according to another specific example embodiment.

Figure 7:
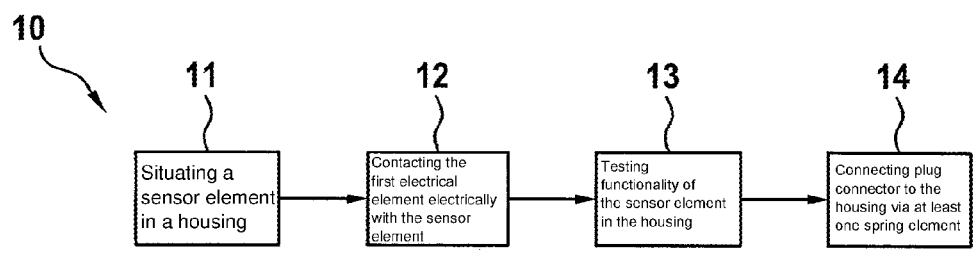

FIG. 7 shows a schematic depiction of a method for manufacturing a sensor system according to another specific example embodiment.

DETAILED DESCRIPTION OF EXAMPLE EMBODIMENTS

FIG. 1 shows a schematic depiction of a sensor system 100, which is explained in greater detail below with reference to FIG. 2. Sensor system 100 includes a sensor 1, for example, a pressure sensor 1. Pressure sensor 1 may be used, for example, in a medium-pressure range between approximately 10 bar and 100 bar but also in the low-pressure range or in a high-pressure range above 100 bar. Pressure sensor 1 may be, for example, a fuel pressure sensor, e.g., for diesel or gasoline, an oil pressure sensor, a CNG pressure sensor, a transmission pressure sensor, an air conditioning system fluid pressure sensor, a pressure sensor for hydraulic fluids, for example, in a brake circuit or shock absorbers of a motor vehicle.

Sensor 1 has a sensor element 7, for example, a sensor chip having a microelectromechanical structure situated in a housing 1a. Housing 1a may be manufactured of metal, for example, steel. Sensor element 7 may be situated on a glass base, for example. Additional contact elements 1c may be formed in housing 1a, via which first electrical contact elements 6b and electrical feedthroughs 6b may be electrically coupled to sensor element 7. First electrical contact elements 6b may be connecting pins, for example, which are coupled to contact elements 1c via spring contacts 1b. The connecting pins may have a cylindrical, conical, rectangular or other geometric design.

First electrical contact elements 6b may be guided outward through first housing openings 8a in housing 1a, where connection pins 6 of sensor 1 may be formed which permit electrical contacting of sensor element 7 in the interior of hermetically sealed housing 1a. The number of connecting pins 6 of sensor 1 is given as three in FIG. 1, for example, but any other number of connecting pins 6 is also possible.

If sensor element 7 is a pressure sensor element, sensor element 7 may have a microelectromechanical structure, for example, which may be acted upon by pressure via a second housing opening 8b. Sensor element 7 may be situated in a hermetically sealed steel housing 1a, which includes a housing bottom and a cap as an additional housing part in the exemplary embodiment shown here. A recess is formed in the housing bottom as a mounting surface for sensor element 7. The housing bottom may form the hydraulic connection side of sensor system 100, for example, so that access for a medium to an active surface of pressure sensor element 7 is possible through second housing opening 8b.

With the aid of bond wires (not shown) the electrical connections of sensor element 7 may be guided to contact elements 1c. The cap of housing 1a may be situated over sensor element 7 and contact elements 1c and welded to the housing bottom.

Sensor system 100 may have a plug connector 2. Plug connector 2 may have a plastic housing 2c, for example, in which electrically conductive insert elements 2b as electrical contact tongues made of metal, for example, may be situated. Insert elements 2b may have second electrical contact elements 2a on their side facing sensor 1, which may be coupled electrically to connecting pins 6 via spring elements 6a. Second electrical contact elements 2a may have electrical contact surfaces or contact pins, for example.

FIGS. 3, 4, 5 and 6 schematically show exemplary specific embodiments of such spring contacts. As FIG. 3 shows, the first electrical contact element or electrical feedthrough 6b may have a cylindrical connecting pin. Spring element 6a may be a spiral spring, for example, which is attached to the connecting pin. Connecting pin 6b, for example, may have a first section having a first pin diameter and a second section, which is adjacent to the first section and has a second pin diameter smaller than the first pin diameter. Connecting pin 6b may be stepped to some extent on its outwardly facing end, so that a mechanical stop for spring element 6a is created.

Spring elements 6a are pushed onto second electrical contact element 2a by pushing plug connector 2 onto connecting pin 6b via the spring action, thereby permitting a simple and reliable electrical contacting. Plug connector 2 may have a corresponding guide 6c for spiral springs 6a.

The specific exemplary embodiment schematically shown in FIG. 4 differs from the specific embodiment shown in FIG. 3 in that spiral spring 6a has a first section having a first spiral diameter and a second section which is adjacent to the first section and has a second spiral diameter smaller than the first spiral diameter. Electrical feedthrough 6b in FIG. 4 is a connecting pin of a constant pin diameter. The first section of spiral spring 6a is pushed over connecting pin 6b, so that the second section of spiral spring 6a acts as a mechanical stop. Spiral spring 6a and connecting pin 6b are again accommodated in a guide 6c in plug connector 2.

FIG. 5 shows a schematic depiction of a detail of sensor system 100, in which spring element 6a may have a flexible electrically conductive clip attached to the electrical feedthrough or first electrical contact element 6b. Flexible electrically conductive clip 6a may have a flat spring element, for example, a "C" spring or an "S" spring.

FIG. 6 shows a schematic depiction of a detail of sensor system 100 in which spring element 6a is attached to a contact pin of plug connector 2. Spring element 6a may have a shape tapering down toward the lower end, so that the lower section of spring element 6a sits directly on a contact surface of first electrical contact element 6b and thereby contacts first electrical contact element 6b, forming an electrical contact.

The specific embodiments shown in FIGS. 3 through 6 may be configured variably and in an application-specific manner, depending on the shape and number of connecting pins 6. It is possible in particular to electrically connect plug connectors 2 to sensor 1 in a modular manner using different contacting systems.

Again with reference to FIG. 2, a first seal 4 may be provided between plug connector 2 and sensor 1, whereby the electrical contacts of connecting pin 6 may be completely shielded from the outside world. First seal 4 may be a two-component seal or a silicone seal, for example.

Sensor system 100 may also have a pressure connection 3, including a recess 3a, in which housing 1a is accommodated so that it is flush, and including a pressure channel 3b which is coupled with second housing opening 8b. Pressure connection 3 may be, for example, a metallic pressure connection or a plastic pressure connection. Depending on the application, a second seal 5 may be situated between pressure connection 3 and housing 1a. For example, second seal 5 may be a sealing ring. However, it may also be possible for pressure connection 3 having sensor 1 to be glued, welded or extrusion coated with plastic. For example, the housing surface of housing 1a may be roughened by laser structuring, for example, in the area of second housing opening 8b to provide a robust connection between pressure connection 3 and housing 1a.

It may also be possible to seal a metallic pressure connection 3 with respect to sensor 1 via a flange 3b on the side walls of housing 1a. Alternatively, when using a pressure connection 3 made of plastic, a laser transmission welding of pressure connection 3 to housing 1a may take place. It is also possible to seal pressure connection 3 by extrusion coating of sensor 1 with plastic.

A medium such as a gas or liquid may be conducted through pressure channel 3b to sensor element 7. Due to the modular design of the sensor system, flexible and application-specific contacting of the sensor system with various pressure connections may be made possible. Sensor element 7 may have, for example, a pressure sensor element having corresponding microelectromechanical structures with the aid of which it is possible to generate a measuring signal which is characteristic for the ambient pressure of the medium applied to sensor element 7.

FIG. 7 shows a schematic depiction of a method 10 for manufacturing a sensor system, in particular a sensor system 100, which is explained with respect to FIGS. 1 through 6. In a first step 11, a sensor element 7 may be situated in a housing 1a, sealed off from the outside world. At least one first electrical contact element or one electrical feedthrough 6b may be electrically contacted with sensor element 7 in a subsequent second step 12. First electrical contact element 6b may optionally be passed through a housing opening 8a in housing 1a.

At this stage of production, a test 13 of the functionality of sensor element 7 in housing 1a may then take place. The test may include sensor tuning, for example, an electronic test procedure or other test steps. It is possible in this way to ensure the functionality of sensor 1 at the very start of the value creation chain, thus saving time and expense. After step 13 of testing, a plug connector 2 having at least one second electrical contact element 2a, for example, a contact surface or a contact pin, may be connected in a step 14 to housing 1a via at least one spring element 6a, which is coupled between the at least one second electrical contact element 2a and the at least one first electrical contact element 6b. Sensor element 7 may be electrically connected to second electrical contact element 2a of plug connector 2 in this way.

If sensor element 7 includes a pressure sensor element, for example, a pressure connection 3 may be connected, so that a sensor system 100 may be produced as shown in FIGS. 1 and 2.

What is claimed is:

1. A sensor system, comprising:
   a sensor element;
   a housing in which sensor element is situated and which seals the sensor element from the outside world;
   at least two first electrical contact elements which are electrically connected to the sensor element;
   a plug connector which has at least two second electrical contact elements;
   at least two spring elements which are coupled between the at least two second electrical contact elements and the at least two first electrical contact elements for electrical contacting, so that the sensor element is electrically connected to the second electrical contact elements of the plug connector; and
   a second seal which is situated between a pressure connection and the housing, wherein the at least two spring elements exert vertical pressure on the second seal, so that the second seal creates a hermetic sealing which separates a medium under pressure to be measured from the first and second electrical contact elements, and wherein the at least two first electrical contact elements are passed through a respective at least two first housing openings in the housing.

2. The sensor system as recited in claim 1, wherein the at least two spring elements have a flexible electrically conductive clip which sits on the at least two first electrical contact elements.

3. The sensor system as recited in claim 1, further comprising:
   a first seal which is situated between the plug connector and the housing.

4. The sensor system as recited in claim 1, wherein the sensor element includes a pressure sensor element and the housing has a second housing opening via which the sensor element is connected to the outside world.

5. The sensor system as recited in claim 4, wherein the pressure connection has a recess in which the housing is accommodated so that the housing is flush, and further comprising a pressure channel which is coupled to the second housing opening so that a medium is conductible through the pressure channel to the sensor element.

6. A sensor system, comprising:
a sensor element;
a housing in which sensor element is situated and which seals the sensor element from the outside world;
at least two first electrical contact elements which are electrically connected to the sensor element;
a plug connector which has at least two second electrical contact elements;
at least two spring elements which are coupled between the at least two second electrical contact elements and the at least two first electrical contact elements for electrical contacting, so that the sensor element is electrically connected to the second electrical contact elements of the plug connector; and
a second seal which is situated between a pressure connection and the housing, wherein the at least two spring elements exert vertical pressure on the second seal, so that the second seal creates a hermetic sealing which separates a medium under pressure to be measured from the first and second electrical contact elements, and wherein the at least two spring elements include a spiral spring and the at least two first electrical contact elements include a connecting pin, the spiral spring being attached to the connecting pin.

7. The sensor system as recited in claim 6, wherein the spiral spring has a first section having a first spiral diameter, and a second section which is adjacent to the first section and has a second spiral diameter which is smaller than the first spiral diameter.

8. The sensor system as recited in claim 6, wherein the connecting pin has a first section having a first pin diameter, and a second section which is adjacent to the first section and has a second pin diameter which is smaller than the first pin diameter.

9. A sensor system, comprising:
a sensor element;
a housing in which sensor element is situated and which seals the sensor element from the outside world;
at least two first electrical contact elements which are electrically connected to the sensor element;
a plug connector which has at least two second electrical contact elements;
at least two spring elements which are coupled between the at least two second electrical contact elements and the at least two first electrical contact elements for electrical contacting, so that the sensor element is electrically connected to the second electrical contact elements of the plug connector; and
a second seal which is situated between a pressure connection and the housing, wherein the at least two spring elements exert vertical pressure on the second seal, so that the second seal creates a hermetic sealing which separates a medium under pressure to be measured from the first and second electrical contact elements, and wherein the at least two spring elements include a spiral spring having a tapering shape, and the at least two first electrical contact elements include a connecting pin, the spiral spring being attached to the at least two second electrical contact elements and sitting on the connecting pin at a tapered end.

10. A method for manufacturing a sensor system, comprising:
situating a sensor element, the sensor element including a pressure sensor element, in a housing which seals the sensor element from the outside world, the housing having a second housing opening, via which the sensor element is connected to the outside world;
electrically contacting at least two first electrical contact elements with the sensor element;
testing functionality of the sensor element in the housing;
after the testing, connecting a plug connector having at least two second electrical contact elements to the housing via at least two spring elements which are coupled between the at least two second electrical contact elements and the at least two first electrical contact elements, so that the sensor element is electrically connected to the second electrical contact elements of the plug connector; and
connecting a pressure connection which has a pressure channel to the housing, so that a medium is conductible through the pressure channel and the second housing opening to the sensor element, wherein
a second seal is placed between the pressure connection and the housing, and the at least two spring elements exert vertical pressure on the second seal, so that the second seal creates a hermetic sealing which separates the pressure channel from the first and second electrical contact elements, and
the at least two first electrical contact elements are passed through a respective at least two first housing openings in the housing.

* * * * *